Figure 1:
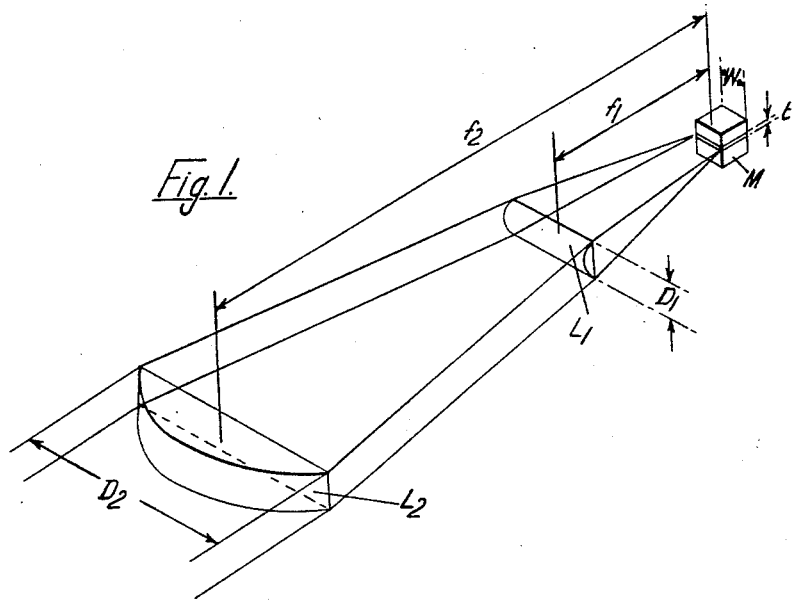

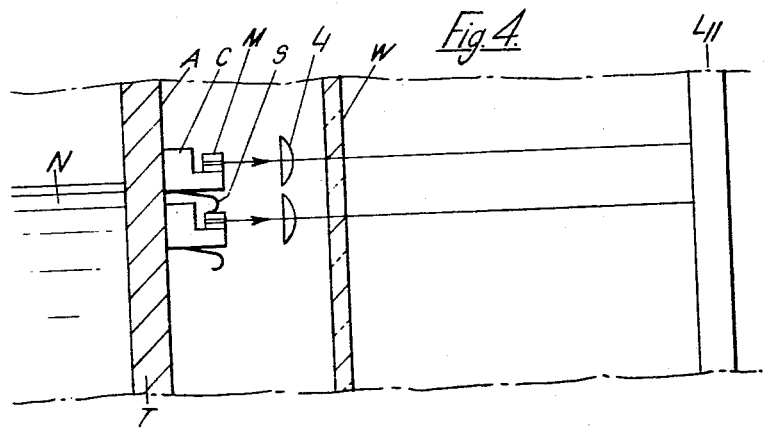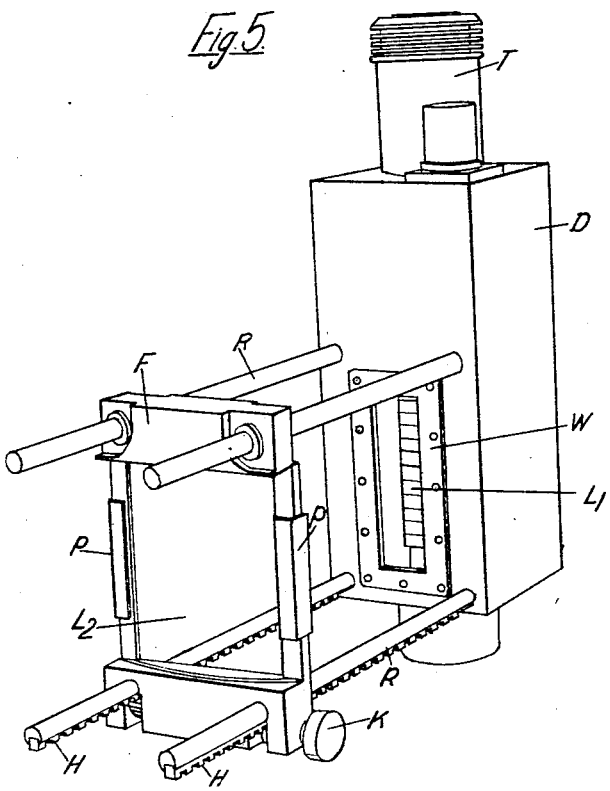

United States Patent Office 3,396,344
Patented Aug. 6, 1968

3,396,344
SEMICONDUCTOR LASER ARRAY
Ronald Francis Johnston Broom, Westmill, Buntingford, England, assignor to National Research Development Corporation, London, England, a British corporation
Filed Feb. 18, 1965, Ser. No. 433,751
Claims priority, application Great Britain, Feb. 24, 1964, 7,521/64
10 Claims. (Cl. 331—94.5)

This invention is concerned with solid state lasers and more particularly with a semiconductor laser array providing a much greater and more concentrated output than is obtainable from existing laser systems.

One object of the invention is to provide a very compact structure for the collimation of the output from a a semiconductor laser and a further object is to produce from an array of solid state lasers a parallel beam of radiation which has the same divergence as the beam from a single laser although the losses in the system are so small that the total power in the beam is substantially equal to the power from a single laser multiplied by the number of lasers in the array.

With the present techniques of producing a solid state laser consisting of a slice of semiconductor containing a P-N junction layer, the thickness of the junction layer is between 1 and 5 microns and cannot be successfully made much greater, so that the emitting end surface of such a thin layer acts as a diffracting slit for the emitted radiation which consequently diverges until it subtends an angle of about 30° in a sagittal plane, perpendicular to the junction, whilst a smaller divergence of beam of about 10° in the tangential plane, parallel to the junction, also occurs. Another drawback of existing semiconductor lasers is that the power output from them is very limited, and attempts to increase the output power, such as by increasing the length or breadth of a laser element lead to difficulties, either as a result of destruction of the polished end faces at which the laser oscillation is reflected to set up the resonances causing the laser action, or deterioration of the excitation as the laser becomes too large to respond properly to the pulsed drive by which the laser action is maintained.

When focussing by a spherical lens is used with a solid state laser such as a junction in gallium arsenide, in which the width of the junction is about 1 mm. and the effective thickness of the junction is less than 10 microns so that the beam dimension in its plane is determined in practice by the resolution of the lens, the diameter of a lens to give a beam width of 1° is 3 cms. and if a much narrower beam is required the lens becomes extremely large and bulky compared with the laser and its mounting.

The production of a parallel beam from an array of laser and spherical lens combinations would require a system which is both very large, as the elements could not be spaced closer than the diameter of the lenses and their mounts, i.e. about 4 cms. for a 1° beam width, and difficult to line up because each lens would have to be individually focussed and directed. Another possible disadvantage arising from the use of a spherical lens is the large length/thickness ratio of the image, about 100:1.

The present invention obviates all the difficulties above-mentioned and consists of a semiconductor laser structure comprising a solid state laser formed by a block of semiconductor material containing a P-N junction layer having two opposite end faces optically polished flat and parallel to one another as resonator reflectors, one of said end faces being a radiation emitting surface when the laser is excited, in combination with:

(a) A short focus plano-cylindrical collimating lens of aperture $f/2$ with its plane face towards and parallel to the laser emitting surface, the axis of curvature of said lens spaced from the laser emitting surface at the focal distance of the lens and in the tangential plane parallel to the junction layer, the width and length of said lens being such that it intercepts substantially all of the radiation emitted from said laser emitting surface, and (b) A second plano-cylindrical lens of longer focus than the first-mentioned lens and of aperture $f/6$ with its plane face towards and parallel to the laser emitting surface to receive the radiation focussed by the first lens, the axis of curvature of said lens being spaced from the laser emitting surface by at least the focal distance of the lens and located in the sagittal plane perpendicular to the plane of the P-N junction layer.

A further feature of the invention is the production of higher power beams by the use of a multiple array of laser elements with an extension of the plano-cylindrical lens system to cover the multiplicity of laser elements.

Figure 6:
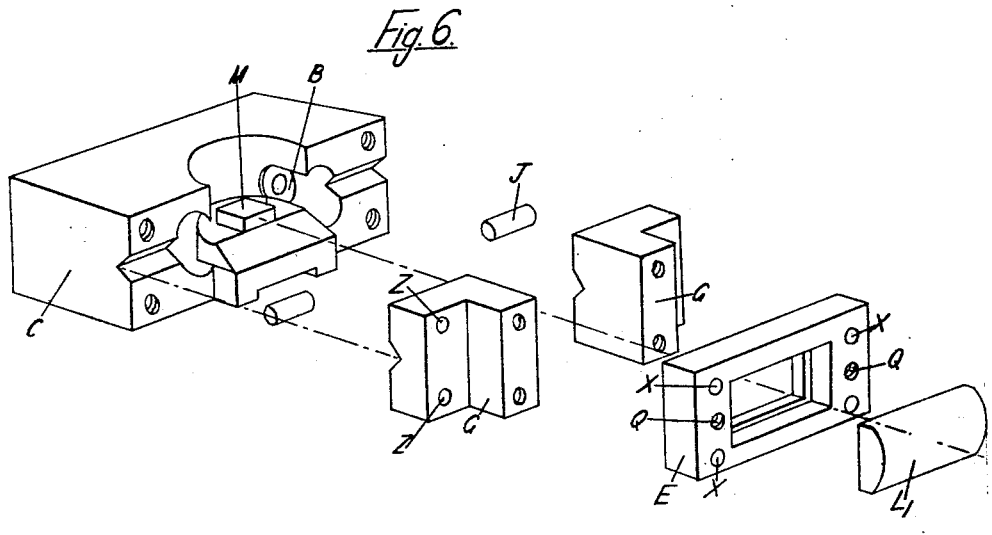
Figure 2:
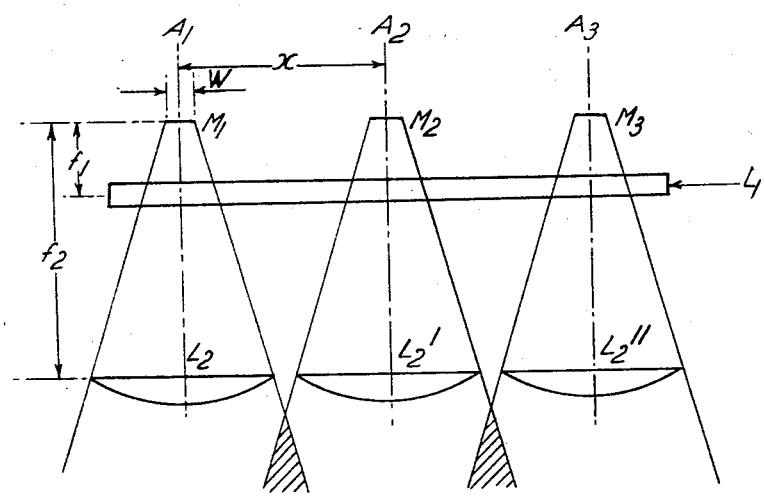
Figure 3:
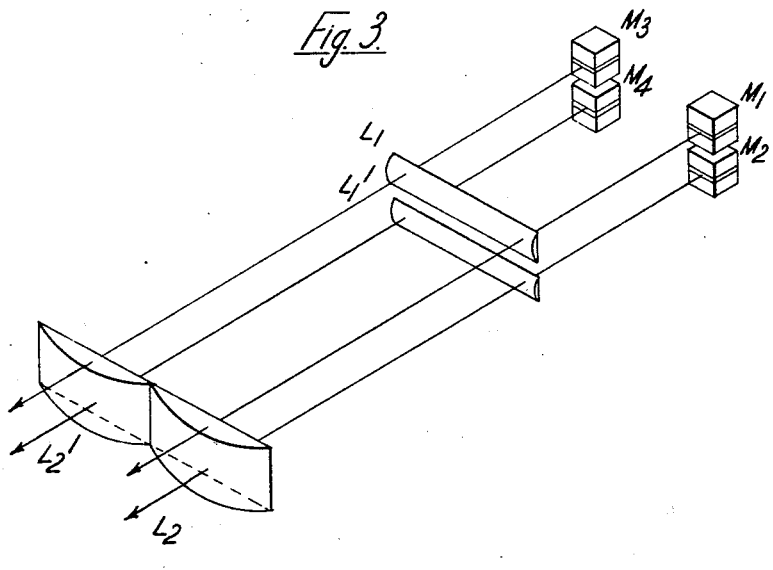

These and other features of the invention are illustrated by way of example in the accompanying drawings: FIGS. 1 and 2 are diagram illustrations used to explain the invention; FIG. 3 is a diagrammatic view of an alternative arrangement; FIG. 4 illustrates in diagram form a preferred construction; FIG. 5 is a perspective view of that construction and FIG. 6 illustrates a detail of the FIG. 5 construction.

In FIG. 1 there is shown diagrammatically a laser element M containing a junction of width $w$ and thickness $t$ the radiation from which is first focussed by a plano-cylindrical lens $L_1$ with its axis of curvature parallel to the junction and at a distance $f_1$ from the radiating face of the laser element L equal to the focal length of the lens $L_1$ so that the beam is made parallel in one dimension. The beam is made parallel in its other transverse dimension by another plano-cylindrical lens with its axis of curvature perpendicular to the plane of the junction and at a distance $f_2$ from the face of the element L equal to its focal length. The width of the lenses $L_1$ and $L_2$ are $D_1$ and $D_2$ respectively.

To accept all the radiation in a sagittal plane $L_1$ must have an aperture of $f/2$ but to form a narrow beam in this plane it need only have a short focal length. For example, for a beam divergence of one tenth of a degree its focal length should be 6 mm. and its width $D_1$ for $f/2$ is 3 mm.

After transmission through $L_1$ the beam has a divergence of one tenth of a degree in a sagittal plane and 10° in a tangential plane. $L_2$ need only have an aperture of $f/6$ and its focal length defines the largest dimension of the beam. For 1° $L_2$ has a focal length of 6 cm. and width ($D_2$) 1 cm. The arrangement described produces a slightly better shaped beam than does a spherical lens and is very much more compact without any sacrifice in efficiency.

The system can be extended to cover an array of multiple laser elements and FIG. 2 shows its application to a line of three laser elements ($M_1$, $M_2$, $M_3$) the lens $L_1$ being lengthened across the three elements on the axes $A_1$, $A_2$, and $A_3$, and the second lens being triplicated as $L_2$, $L'_2$ and $L''_2$. These lenses must not cover the areas where the beams intersect otherwise an image on $A_2$ will be focussed by $L_1$ and light will be lost. To obtain the minimum separation of lasers, the separation $x$ in FIG. 2 should be at least equal to the width $D_2$ of the lenses $L_2$. For a beam width of 1°, $x=1$ cm., $D_2=1$ cm. and $f2=6$ cm. A second linear array may be placed above the first by using a second long lens like $L_1$ and extending the lenses $L_2$, $L'_2$ and $L''_2$ upwards, and so on for a third line.

An array of 9 elements occupies an area 3 cm. x 0.9 cm., and an array of 100 elements occupies an area of 10 cm. x 3 cm. The total number of lenses required for $n$ lasers is $2-5n$.

The advantage of using an array of multiple lasers connected in series to obtain high power output in contrast to a single unit will be apparent from the following example.

A standard laser has a junction length of 0.4 mm. and when driven with 40 a. current pulses will emit a peak power of 20 watts. With a hundred of these units in series to provide 2 kw. peak output, the peak current input is 40 a. and the peak input voltage is 1200 v. approximately. For a 1° beam width the area occupied by such an array is 4 cm. x 3 cm.

On the other hand for a single unit to give the same peak power output of 2 kw., the peak current input is 4000 a. at a peak voltage input of 10 v. approximately. If the maximum power output permissible without damage to the junction is 100 w./mm. of junction length, then the width of the junction must be 20 mm. To obtain a 1° beam width the focal length of a lens must be 120 cm. and even if a double cylindrical optical system is used the width of the second lens must be 20 cm.

Thus the optics for the single unit are very much more bulky than for the multiple array. Also, the drive system for a multiple array is simplified as it is easier to provide 40 a. at 1200 v. than 4000 a. at 10 v., especially if fast pulses are required.

A multiple laser array of four lasers $M_1$, $M_2$, $M_3$, $M_4$, arranged as two rows of two lasers is illustrated diagrammatically in perspective in FIG. 3 with their associated lens system $L_1$, and $L_1^1$ and $L_2$ and $L_2^1$.

The arrangement and constructional details of a linear array of ten lasers is illustrated in FIGS. 4 to 6.

In the construction each laser diode is 2 mm. long and 1 mm. wide across the emitting surface. The diodes are made by polishing flat one face of a slice of N-type gallium arsenide and diffusing zinc into the opposite face of the slice to convert it into P-type with the P-N junction layer across the middle of the slice which is then cut into bars of 2 mm. width and the opposite longer faces of the bars are polished flat and perpendicular to the original polished face so that each bar has two opposite faces flat and parallel to one another transverse to the junction layer. The bars are divided transversely by cuts 1 mm. apart into laser diode elements of 2 mm. by 1 mm. (and about 0.4 mm. thick) which then have a gold/zinc alloy contact attached to the unpolished P-type surface and an antimony/tin alloy contact attached to the unpolished N-type surface. One of the opposing polished faces of each diode element is coated with silica and a silver layer to prevent emission of light from that face and to direct all of the laser radiation out of the opposite polished face which is the emitting surface.

An array of ten such laser elements can be expected to give a peak light output of 1 kw. and a mean output of nearly 10 watts.

The construction of the linear array is shown diagrammatically in FIG. 4, although for clarity only two of the elements are drawn. Each laser diode M is soldered to a copper block C which also supports a plano-cylindrical lens $L_1$ of focal length 6 mm. The lens mount is fitted with means for focussing and alignment as described with reference to FIG. 6 so that all ten beams may be adjusted for parallelism with one another. The copper blocks C are clamped to an anodised aluminium heat sink in the form of a tube T cooled with liquid nitrogen indicated at N. The anodising layer A gives good thermal contact but isolates the blocks from one another electrically so that the lasers may be connected in series by means of the springs S. The structure so far described is contained in a dewar vessel (indicated at D in FIG. 5) which is provided with a glass window W opposite the lasers M and lenses $L_1$, the space surrounding the tube of liquid nitrogen being evacuated. Focussing of the laser beam in a tangential plane is achieved by the lens $L_2$ of 20 cm. focal length placed outside the dewar vessel. Thus the largest dimension of the beam, as determined by $L_2$ is ⅓°. Preliminary measurements on a structure as in FIG. 4 give the following results. The measured beam width is 5 milliradians in a horizontal plane and 2 milliradians in a vertical plane; in agreement with the values calculated from the focal lengths of the lenses and the accuracy of alignment. When driven with 240 amp., 0.7 microsecond pulses the peak light power output is 500 watts.

FIG. 5 illustrated in perspective view an arrangement constructed according to FIG. 4. FIG. 5 shows the liquid nitrogen cooling tube T surrounded by the dewar vessel D provided with the glass window W hermetically sealed to the vessel D and through the window can be seen the linear array of ten lasers and their individual lenses $L_1$. The second lens $L_2$ is supported from the dewar vessel on rigid guide rods R on which slides a frame F carrying the lens $L_2$ secured in the frame by clips P. Focussing by the lens $L_2$ is adjusted by the knob K to turn pinions meshing with the racks H on the two lower rods R.

Constructional details of the mounting for each laser M and the first lens $L_1$ of the FIGS. 4 and 5 construction are illustrated in the exploded view of FIG. 6. There is shown a laser M mounted on the copper block C which can be attached to the heat sink (T of FIG. 5) by bolts passing through the insulating bushes B. The lens $L_1$ is carried in a holder E bolted to brackets G which in turn are bolted to the front face of the copper block C with pivot rollers J interposed between the brackets G and the block C, the rollers J being located in the V grooves in the mating faces of the blocks and brackets. Exact location of the lens holder and lens $L_1$ can be determined by adjustment screws through the screwed holes Q in the holder to bear on the ends of the brackets against the pull of the clamping bolts through the clearance holes X into the brackets, whilst rocking of the brackets G on the pivot rollers between the V grooves can be effected by slackening and tightening of the appropriate bolts through the bracket holes Z into the face of the copper block C.

I claim:

1. A semiconductor laser structure comprising a solid state laser formed by a block of semiconductor material containing a P–N junction layer having two opposite end faces optically polished flat and parallel to one another as resonator reflector, one of said end faces being a radiation emitting surface when the laser is excited, in combination with
    (a) a short focus plano-cylindrical collimating lens of aperture $f/2$ with its plane face towards and parallel to the laser emitting surface, the axis of curvature of said lens being spaced from the laser emitting surface at the focal distance of the lens and located in the tangential plane parallel to the junction layer, and
    (b) a second plano-cylindrical lens of longer focus than the first-mentioned lens and of aperture $f/6$ with its plane face towards and parallel to the laser emitting surface to receive the radiation focussed by the first lens, the axis of curvature of said second lens being spaced from the laser emitting surface by at least the focal distance of the lens and located in the sagittal plane perpendicular to the plane of the P–N junction layer.

2. A semiconductor laser array comprising a plurality of solid state lasers each formed by a block of semiconductor material containing a P–N junction layer having two opposite end faces optically polished flat and parallel to one another as resonator reflector, one of said end faces of each laser being a radiation emitting surface when the laser is excited, said lasers being mounted adjacent to one another with their radiation emitting surfaces in a common plane, in combination with
    (a) a short focus plano-cylindrical collimating lens with its plane face towards and parallel to the lasers emitting surfaces, the area of said plane face being at least equal to the area of several laser emitting surfaces, the axis of curvature of said lens being spaced from the plane of the laser emitting surfaces by the focal distance of the lens and located in the tangential plane, parallel to the junction layers to focus the radiation emitted from them, and (b) additional plano-cylindrical lenses of longer focus than the first mentioned lens with their plane faces towards and parallel to the laser emitting surfaces in the paths of the radiation focussed by the first lens, the axes of curvature of said additional lenses being spaced from the laser emitting surfaces by at least the focal distances of the lenses and located in the sagittal plane perpendicular to the plane of the P–N junction layer.

3. A semiconductor laser array comprising a plurality of solid state lasers each formed by a block of semiconductor material containing a P–N junction layer having two opposite end faces optically polished flat and parallel to one another as resonator reflectors, one of said end faces of each laser being a radiation emitting surface when the laser is excited, a short focus plano-cylindrical lens to focus the radiation emitted from each laser, said lens having its plane face towards and parallel to the laser emitting surface and the axis of curvature of said lens being spaced from the laser emitting surface at the focal distance of the lens and located in the plane of the P–N junction layer, said lasers and their associated lenses being grouped together and mounted with the laser emitting surfaces co-planar and the junction layers parallel to provide a multiple array of plane focussed beams directed on to a common plano-cylindrical lens of longer focus than the first mentioned lenses and mounted with its plane face towards the laser array and its axis of curvature spaced from the laser emitting surfaces by at least the focal distance of the lens and located in the sagittal plane perpendicular to the P–N junction layers.

4. A semiconductor laser array as claimed in claim 3 in which the lasers are connected for excitation in series.

5. A semiconductor laser array as claimed in claim 3 in which the lasers are mounted on a common heat sink.

6. A semiconductor laser array as claimed in claim 3 in which the lasers are contained in a dewar vessel with a light transparent window opposite the radiation emitting surfaces of the lasers.

7. A semiconductor laser array as claimed in claim 3 in which each laser is mounted on a metal block attached to, but insulated from the outer wall of a vessel containing cooling medium.

8. A semiconductor laser array as claimed in claim 3 in which each laser and its first lens are mounted on a metal block in the evacuated space between the double walls of a dewar vessel having a hermetically sealed light transparent window in front of the lenses.

9. A semiconductor laser array as claimed in claim 3 in which each laser and its first lens are mounted together on a metal block, the lens being held in a frame adjustably attached to brackets pivotally mounted on the block in front of the laser to permit of the alignment into parallelism of the laser beams.

10. A semiconductor laser array as claimed in claim 3 in which the lasers and their first lenses are mounted together in the evacuated space between the double walls of a Dewar vessel having a hermetically sealed light transparent window in front of the lenses, the lasers being mounted for good heat transmission from them on the inner wall of the Dewar vessel containing a cooling medium and the lenses adjustably mounted in front of them behind the window, with the common longer focus lens in front of the window and slidable towards and away from it on guide rods protruding from the outside of the Dewar vessel.

No references cited.

JEWELL H. PEDERSEN, *Primary Examiner.*

W. L. SIKES, *Assistant Examiner.*